United States Patent [19]

Drapier et al.

[11] Patent Number: 4,857,226

[45] Date of Patent: Aug. 15, 1989

[54] THIXOTROPIC CLAY AQUEOUS SUSPENSIONS CONTAINING POLYACRYLIC ACID POLYMER OR COPOLYMER STABILIZERS

[75] Inventors: Julien Drapier, Seraing; Chantal Gallant, Cheratte; Daniel van de Gaer, Flemalle, all of Belgium

[73] Assignee: Colgate-Palmolive Company, New York, N.Y.

[21] Appl. No.: 924,385

[22] Filed: Oct. 29, 1986

[51] Int. Cl.$^4$ ............................................. C11D 17/00
[52] U.S. Cl. ........................ 252/174.25; 252/174.24; 252/188.1; 252/108
[58] Field of Search ........... 252/174.24, 188.1, 174.23, 252/108, 174.25

[56] References Cited

U.S. PATENT DOCUMENTS 3,629,122  12/1971  Jacobi ................................. 252/108
4,147,650  4/1979  Sabatelli et al. .................... 252/135

FOREIGN PATENT DOCUMENTS 2116199  9/1983  United Kingdom .
2140450  11/1984  United Kingdom .

Primary Examiner—Paul Lieberman
Assistant Examiner—John F. McNally
Attorney, Agent, or Firm—M. M. Grill; N. Blumenkopf

[57] ABSTRACT

The physical stability and rheological properties variations of liquid gel-like compositions based on montmorillonite, attapulgite, hectorite or other inorganic colloid-forming clay or other thixotropic thickener are greatly improved by incorporating in the composition small amounts, such as about 1.0 weight percent, of polyacrylic acid polymers or copolymers and their salts and small amounts, such as 0.2 or 0.4 weight percent, of calcium, magnesium, aluminum or zinc stearate or other polyvalent metal salt of long chain fatty acid. The aqueous compositions containing inorganic builder salts and other functional inorganic salts, chlorine bleach, bleach-stable detergent, thixotropic thickener, and polyacrylic acid polymers and copolymers and their salts and polyvalent metal salt of a fatty acid as physical stabilizers remain stable against rheological properties variations with time and phase separation for periods in excess of twelve weeks under a wide range of temperatures. The thixotropic properties can be retained or improved using smaller levels, such as 0.20 to 0.5%, of the clay thixotropic thickener than in the absence of the polyacrylic acid polymer or copolymer physical stabilizer. Use as liquid gel-like automatic dishwasher compositions are described.

36 Claims, No Drawings

THIXOTROPIC CLAY AQUEOUS SUSPENSIONS CONTAINING POLYACRYLIC ACID POLYMER OR COPOLYMER STABILIZERS

The present invention relates to thixotropic clay aqueous suspension with improved physical stability. More specifically the invention relates to the use of polyacrylic acid polymers or copolymers and their salts and metal salts of long chain fatty acids as physical stabilizers for thixotropic clay aqueous suspensions.

The addition of small effective amounts of polyacrylic acid polymers and copolymers and their salts and small effective amounts of polyvalent metal salts of long chain fatty acids significantly improves the physical stability and rheological properties variations with time of thixotropic clay aqueous suspensions detergent compositions. The thixotropic properties can be retained or improved using smaller levels, such as 0.25 to 0.4%, of the clay thixotropic thickener than in the absence of the polyacrylic acid polymer or copolymer physical stabilizer.

The present invention specifically relates to automatic dishwashing detergent compositions having thixotropic properties, improved chemical and physical stability, improve stability against rheological properties variations with time, and with increased apparent viscosity, and which are readily dispersible in the washing medium to provide effective cleaning of dishware, glassware, china and the like.

Commercially available household-machine dishwasher detergents provided in powder form have several disadvantages, e.g. non-uniform composition; costly operations necessary in their manufacture; tendency to cake in storage at high humidities, resulting in the formation of lumps which are difficult to disperse; dustiness, a source of particular irritation to users who suffer allergies; and tendency to cake in the dishwasher machine dispenser.

Recent research and development activity has focused on the gel or "thixotropic" form of such compositions, e.g. scouring cleansers and automatic-dishwasher products characterized as thixotropic pastes. Dishwasher products so provided are primarily objectionable in that they are insufficiently viscous to remain "anchored" in the dispenser cup of the dishwasher. Ideally, thixotropic cleansing compositions should be highly viscous in a quiescent state, Bingham plastic in nature, and have relatively high yield values. When subjected to shear stresses, however, such as being shaken in a container or squeezed through an orifice, they should quickly fluidize and, upon cessation of the applied shear stress, quickly revert to the high viscosity/Bingham plastic state. Stability is likewise of primary importance, i.e. there should be no significant evidence of phase separation or leaking after long standing.

The U.S. Patent Application Ser. No. 744,754 filed June 14, 1985, which is assigned to applicants' is directed to thixotropic clay aqueous suspensions dishwashing detergent compositions containing aluminum stearate as physical stabilizing agent. The application Ser. No. 744,754 compositions show improvement in the physical stability of the detergent composition and improvement against phase separation over those clay containing compositions that do not contain the aluminum stearate. The application Ser. No. 744,754 formulations, however, have in some instances experienced difficulty in achieving stability against rheological properties variations with time and over wide temperature changes and have generally required relatively high clay content, such as 0.25 to 2.0%.

The provision of automatic-dishwasher compositions in gel form having the aforedescribed properties, other than for the improvements described in the above mention application Ser. No. 744,754, has thus far proven problematical, particularly as regards compositions for use in home dishwasher machines. For effective use, it is generally recommended that the automatic dishwashing detergent, hereinafter also designated ADD, contain (1) sodium tripolyphosphate (NaTPP) to soften or tie up hard-water minerals and to emulsify and/or peptize soil; (2) sodium silicate to supply the alkalinity necessary for effective detergency and to provide protection for fine china glaze and pattern; (3) sodium carbonate, generally considered to be optional, to enhance alkalinity; (4) a chlorine-releasing agent to aid in the elimination of soil specks which lead to water spotting; and (5) defoamer/surfactant to reduce foam, thereby enhancing machine efficiency and supplying requisite detergency. See, for example, SDA Detergents in Depth, "Formulations Aspects of Machine Dishwashing," Thomas Oberle (1974). Cleansers approximating to the aforedescribed compositions are mostly liquids or powders. Combining such ingredients in a gel form effective for home-machine use has proved difficult. Generally, such compositions omit hypochlorite bleach, since it tends to react with other chemically active ingredients, particularly surfactant. Thus, U.S. Pat. No. 4,115,308 discloses thixotropic automatic dishwasher pastes containing a suspending agent, e.g. CMC, synthetic clays or the like; inorganic salts including silicates, phosphates and polyphosphates; a small amount of surfactant and a suds depressor. Bleach is not disclosed. U.S. Pat. No. 4,147,650 is somewhat similar, optionally including Cl-(hypochlorite) bleach but no organic surfactant or foam depressant. The product is described, moreover, as a detergent slurry with no apparent thixotropic properties.

U.S. Pat. No. 3,985,668 describes abrasive scouring cleaners of gel-like consistency containing (1) suspending agent, preferably the Smectite and attapulgite types of clay; (2) abrasive, e.g. silica sand or perlite; and (3) filler comprising light density powdered polymers, expanded perlite and the like, which has a bouyancy and thus stabilizing effect on the composition in addition to serving as a bulking agent, thereby replacing water otherwise available for undesired supernatant layer formation due to leaking and phase destabilization. The foregoing are the essential ingredients. Optional ingredients include hypochlorite bleach, bleach stable surfactant and buffer, e.g. silicates, carbonates, and monophosphates. Builders, such as NaTPP, can be included as further optional ingredients to supply or supplement building function not provided by the buffer, the amount of such builder not exceeding 5% of the total composition, according to the patent. Maintenance of the desired (greater than) pH 10 levels is achieved by the buffer/builder components. High pH is said to minimize decomposition of chlorine bleach and undesired interaction between surfactant and bleach. When present, NaTPP is limited to 5%, as stated. Foam killer is not disclosed.

In U.K. Patent Application Nos. GB 2,116,199A and GB 2,140,450A, both of which are assigned to Colgate-Palmolive, liquid ADD compositions are disclosed which have properties desirably characterizing thixotropic, gel-type structure and which include each of the various ingredients necessary for effective detergency with an automatic dishwasher. the normally gel-like aqueous automatic dishwasher detergent composition having thixotropic properties includes the following ingredients, on a weight basis:
(a) 5 to 35% alkali metal tripolyphosphate;
(b) 2.5 to 20% sodium silicate;
(c) 0 to 9% alkali metal carbonate;
(d) 0.1 to 5% chlorine bleach stable, water dispersible organic detergent active material;
(e) 0 to 5% chlorine bleach stable foam depressant;
(f) chlorine bleach compound in an amount to provide about 0.2 to 4% of available chlorine;
(g) thixotropic thickener in an amount sufficient to provide the composition with thixotropy index of about 2.5 to 10;
(h) sodium hydroxide, as necessary, to adjust pH; and
(i) balance water.

ADD compositions so formulated are low-foaming; are readily soluble in the washing medium and most effective at pH values best conductive to improved cleaning performance, viz, pH 10.5–14.0. The compositions are normally of gel consistency, i.e. a highly viscous, opaque jelly-like material having Bingham plastic character and thus relatively high yield values. Under such conditions, the composition is quickly fluidized and easily dispersed. When the shear force is discontinued, the fluid composition quickly reverts to a high viscosity, Bingham plastic state closely approximating its prior consistency.

U.S. Pat. No. 4,511,487 dated Apr. 16, 1985 describes a low-foaming detergent paste for dishwashers. The patented thixotropic cleaning agent has a viscosity of at least 30 Pa.s at 20° C. as determined with a rotational viscometer at a spindle speed of 5 revolutions per minute. The composition is based on a mixture of finely divided hydrated sodium metasilicate, an active chlorine compound and a thickening agent which is a foliated silicate of the hectorite type. Small amount of nonionic tensides and alkali metal carbonates and/or hydroxides may be used.

The formation of organoclays by the interaction of clays (such as benotonite and hectorite) with organic compounds such as quaternary ammonium salts, has also been described (W.S. Mardis, JAOCS, Vol. 61, No. 2, p. 382 (1984)).

While these previously disclosed liquid ADD formulations are not subject or are subject to a lesser degree to one or more of the above described deficiencies, it has been found that further improvements in physical stability and stability against rheological properties variations with time are desired to increase the shelf-life of the product and thereby enhance consumer acceptance.

At the same time it would be highly desirable to increase the physical stability and stability against rheological properties variations with time of other clay based thixotropic liquid formulations, such a scouring cleansers; dental pastes, "liquid" soaps, and the like.

Accordingly, it is an object of the invention to provide anti-settling additives for thixotropic clay aqueous suspensions.

It is another object of the invention to provide liquid ADD compositions having thixotropic properties with improved physical stability and improved stability against theological properties variations with time.

It is still another object of the invention to provide thixotropic liquid ADD compositions having reduced levels of thixotropic thickener without adversely effecting the generally high viscosities at low shear rates and lower viscosities at high shear rates which are characteristic of the desired thixotropic properties.

It is still another object of this invention to improve the stability of aqueous thixotropic clay based compositions, especially liquid automatic dishwasher detergent pastes or gels, by incorporating in the clay aqueous suspension a minor amount of polyacrylic acid polymer or copolymer and their salts and a minor amount of a fatty acid metal salt effective to inhibit the settling of the suspended particles and to prevent phase separation.

It is a further object of this invention to improve the stability against rheological properties variations with time of aqueous thixotropic clay based compositions, especially liquid automatic dishwasher detergent pastes or gels, by incorporating in the clay aqueous suspension a small effective amount of polyacrylic acid polymer and copolymer and their salts and a small effective amount of a fatty acid metal salt as stabilizing agents.

These and other objects of the invention which will become more readily understood from the following detailed description of the invention and preferred embodiments thereof are achieved by incorporating in a normally gel-like aqueous liquid composition a small but effective amount of physical stabilizers which are polyacrylic acid polymers and copolymers and their salts and a long chain fatty acid metal salt. More particularly, according to a preferred and specific embodiment of the invention, there is provided a normally gel-like automatic dishwasher detergent composition in which is incorporated an amount of polyacrylic acid polymer or copolymer and their salts and an amount of a metal salt of a long chain fatty acid which are effective to inhibit rheological properties variations with time and effective to inhibit settling of the suspended particles, such as thixotropic agent and sodium tripolyphosphate builder salt.

In accordance with these particular aspects, the present invention provides a normally gel-like aqueous automatic dishwasher detergent composition having thixotropic properties which include, on a weight basis:
(a) 5 to 35% alkali metal polyphosphate;
(b) 2.5 to 20% sodium silicate;
(c) 0 to 9% alkali metal carbonate;
(d) 0.1 to 5% chlorine bleach stable, water dispersible organic detergent active material;
(e) 0 to 5% chlorine bleach stable foam depressant;
(f) chlorine bleach compound in an amount to provide about 0.2 to 4% of available chlorine;
(g) thixotropic thickener in an amount sufficient to provide the composition with thixotropy index of about 2.5 to 10; and
(h) 0 to 8% sodium hydroxide;
(i) polyacrylic acid polymer or copolymer and their salts, and a polyvalent metal salt of a long chain fatty acid in amounts effective to increase the physical stability of the composition and the physical stability of the composition against rheological properties variations with time; and
(j) balance water.

Also related to this specific aspect, the invention provides a method for cleaning dishware in an automatic dishwashing machine with an aqueous wash bath containing an effective amount of the liquid automatic dishwasher detergent (LADD) composition as described above. According to this aspect of the invention, the LADD composition can be readily poured into the dispensing cup of the automatic dishwashing machine and will, within just a few seconds, promptly thicken to its normal gel-like or pasty state.

Generally, LADD effectiveness is directly related to (a) available chlorine levels; (b) alkalinity; (c) solubility in washing medium; and (d) foam inhibition. It is preferred herein that the pH of the LADD composition be at least about 9.5, more preferably from about 10.5 to 14.0 and most preferably at least about 11.5. The presence of carbonate is also often needed herein, since it acts as a buffer helping to maintain the desired pH level. Excess carbonate is to be avoided, however, since it may cause the formation of needle-like crystals of carbonate, thereby impairing the stability, thixotropy and/or detergency of the LADD product, as well as impairing the dispensibility of the product from, for example, squeeze tube bottles. Caustic soda (NaOH) serves the further function of neutralizing the phosphoric or phosphonic acid ester foam depressant when present. About 0.5 to 6 weight percent of NaOH and about 2 to 9 weight percent of sodium carbonate in the LADD composition are typical, although it should be noted that sufficient alkalinity may be provided by the NaTPP and sodium silicate.

The NaTPP employed in the LADD composition in a range of about 8 to 35 weight percent, preferably about 20 to 30 weight percent, should preferably be free of heavy metal which tends to decompose or inactivate the preferred sodium hypochlorite and other chlorine bleach compounds. The NaTPP may be anhydrous or hydrated, including the stable hexahydrate with a degree of hydration of 6 corresponding to about 18% by weight of water or more. Especially preferred LADD compositions are obtained, for example, when using a 0.5:1 to 2:1 weight ratio of anhydrous to hexahydrated NaTPP, values of about 1:1 being particularly preferred.

Foam inhibition is important to increase dishwasher machine efficiency and minimize destabilizing effects which might occur due to the presence of excess foam within the washer during use. Foam may be sufficiently reduced by suitable selection of the type and/or amount of detergent active material, the main foam-producing component. The degree of foam is also somewhat dependent on the hardness of the wash water in the machine whereby suitable adjustment of the propertions of NaTPP which has a water softening effect may aid in providing the desired degree of foam inibition. However, it is generally preferred to include a chlorine bleach stable foam depressant or inhibitor. Particularly effective are the alkyl phosphonic acid esters of the formula

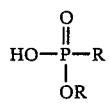

available for example for BASF-Wyandotte (PCUK-PAE), and especially the alkyl acid phosphate esters of the formula

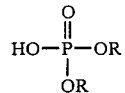

available, for example, from Hooker (SAP) and Kanpsack (LPKn-158), in which one or both R groups in each type of ester may represent independently a $C_{12-20}$ alkyl group. Mixtures of the two types, or any other chlorine bleach stable types, or mixtures of mono-and di-esters of the same type, may be employed. Especially preferred is a mixture of mono- and di-$C_{16-18}$ aklyl acid phosphate esters such as monostearyl/distearyl acid phosphates 1.2/1 (Knapsack) or (UGINE KULHMAN). When employed, proportions of 0.1 to 5 weight percent, preferably about 0.1 to 0.5 weight percent, of foam depressant in the composition is typical, the weight ratio of detergent active component (d) to foam depressant (e) generally ranging from about 10:1 to 1:1 and preferably about 5:1 to 1:1. Other defoamers which may be used include, for example, the known silicones. In addition, it is an advantageous feature of this invention that many of the stabilizing salts, such as the stearate salts, for example, aluminum stearate, are also effective as foam killers.

Although any chlorine bleach compound may be employed in the compositions of this invention, such as dichloro-isocyanurate, dichloro-dimethyl hydantoin, or chlorinated TSP, alkali metal, e.g. potassium, lithium, magnesium and especially sodium, hypochlorite is preferred. The composition should contain sufficient chlorine bleach compound to provide about 0.2 to 4.0% by weight of available chlorine, as determined, for example, by acidification of 100 parts of the composition with excess of hydrochloric acid. A solution containing about 0.2 to 4.0% by weight of sodium hypochlorite contains or provides roughly the same percentage of available chlorine. About 0.8 to 1.6% by weight of available chlorine is especially preferred. For example, sodium hypochlorite (NaOCl) solution of from about 11 to about 13% available chlorine in amounts of about 3 to 20%, preferably about 7 to 12%, can be advantageously used.

The sodium silicate, which provides alkalinity and protection of hard surfaces, such as fine china glaze and pattern, is employed in an amount ranging from about 2.5 to 20 weight percent, preferably about 5 to 15 weight percent, in the composition. The sodium silicate is generally added in the form of an aqueous solution, preferably having an $Na_2O:SiO_2$ ratio of about 1:2 to 1:2.8.

Detergent active material useful herein must be stable in the presence of chlorine bleach, especially hypochlorite bleach, and those of the organic anionic, amine oxide, phosphine oxide, sulphoxide or betaine water dispersible surfactant types are preferred, the first mentioned anionics being most preferred. They are used in amounts ranging from about 0.1 to 5%, preferably about 0.3 to 2.0%. Particularly preferred surfactants herein are the linear or branched alkali metal mono- and/or di-($C_{8-14}$) alkyl diphenyl oxide mono and/or disulphates or disulfonates, commercially available for example as DOWFAX (Registered Trademark) 3B-2 and DOWFAX 2A-1. In addition, the surfactant should be compatible with the other ingredients of the composition. Other suitable surfactants include the primary alkylsulphates, alkylsulphonates, alkylaryl-sulphonates and sec.-alkylsulphates. Examples include sodium $C_{10}$–$C_{18}$ alkylsulphates such as sodium dodecylsulphate and sodium tallow alcoholsulphate; sodium $C_{10}$–$C_{18}$ alkanesulphonates such as sodium hexadecyl-1-sulphonate and sodium $C_{12}C_{18}$ alkylbenzenesulphonates such as sodium dodecylbenzenesulphonates. The corresponding potassium salts may also be employed.

As other suitable surfactants or detergents, the amine oxide surfactant are typically of the structure $R_2R^1N$—O, in which each R represents a lower alkyl group, for instance, methyl, and $R^1$ represents a long chain alkyl group having from 8 to 22 carbon atoms, for instance a lauryl, myristyl, palmityl or cetyl group. Instead of an amine oxide, a corresponding surfactant phosphine oxide $R_2R^1PO$ or sulphoxide $RR^1SO$ can be employed. Betaine surfactants are typically of the structure $R_2R^1N$ —$R'COO^-$, in which each R represents a lower alkylene group having from 1 to 5 carbon atoms. Specific examples of these surfactants are lauryl-dimethylamine oxide, myristyldimethylamine oxide, the corresponding phosphine oxides and sulphoxides, and the corresponding betaines, including dodecyldimethylammonium acetate, tetradecyldiethylammonium pentanoate, hexadecyldimethylammonium hexanoate and the like. For biodegradability, the alkyl groups in these surfactants should be linear, and such compounds are preferred.

Surfactants of the foregoing type, all well known in the art, are described, for example, in U.S. Pat. Nos. 3,985,668 and 4,271,030.

Thixotropic thickeners, i.e. thickeners or suspending agents which provide an aqueous medium with thixotropic properties, are known in the art and may be organic or inorganic water soluble, water dispersible or colloid-forming, and monomeric or polymeric, and should of course be stable in these compositions, e.g. stable to high alkalinity and chlorine bleach compounds, such as sodium hypochlorite. Those especially preferred generally comprise the inorganic, colloid-forming clays of smectite and/or attapulgite types. These materials were generally used in amounts of about 1.5 to 10, preferably 2 to 5 weight percent, to confer the desired thixotropic properties and Bingham plastic character in the assignee's prior disclosed LADD formulations of the aforementioned GB No. 2,116,199A and GB No. 2,140,450A. It is one of the advantages of the LADD formulations of the present invention that the desired thixotropic properties and Bingham plastic character can be obtained in the presence of the polyacrylic acid polymers and copolymers and their salts and the metal salt fatty acid stabilizers of the present invention with lesser amounts of the thixotropic thickeners. For example, amounts of the inorganic colloid-forming clays of the smectite and/or attapulgite types in the range of from about 0.1 to 0.5%, preferably 0.2 to 0.4%, especially 0.25 to 0.30%, are generally sufficient to achieve the desired thixotropic properties and Bingham plastic character when used in combination with the polyacrylic acid polymers and copolymers and fatty acid metal salts physical stabilizers.

Smectite clays include montmorillonite (bentonite), hectorite, attapulgite, smectite, saponite, and the like. Montmorillonite clays are preferred and are available under tradenames such as Thixogel (Registered trademark) No. 1 and Gelwhite (Registered Trademark) GP, H, etc., from Georgia Kaolin Company; and EC-CAGUM (Registered Trademark) GP, H, etc., from Luthern Clay Products. Attapulgite clays include the materials commercially available under the tradename Attagel (Registered Trademark), i.e. Attagel 40, Attagel 50 and Attagel 150 from Engelhard Minerals and Chemicals Corporation. Mixtures of smectite and attapulgite types in weight ratios of 4:1 to 1:5 are also useful herein. Thickening or suspending agents of the foregoing types are well known in the art, being described, for example, in U.S. Pat. No. 3,985,668 referred to above. Abrasives or polishing agents should be avoided in the LADD compositions as they may mar the surface of fine dishware, crystal and the like.

The amount of water contained in these compositions should, of course, be neither so high as to produce unduly low viscosity and fluidity, nor so low as to produce unduly high viscosity and low flowability, thixotropic properties in either case being diminished or destroyed. Such amount is readily determined by routine experimentation in any particular instance, generally ranging from about 45 to 75 weight percent, preferably about 55 to 65 weight percent. The water should also be preferably deionized or softened.

So far, the description of the LADD product, except as otherwise noted, conforms to the compositions as disclosed in the aforementioned U.K. Patent Applications Nos. GB 2,116,199A and GB 2,140,450, which are assigned to applicant's assignee.

The LADD products of the U.K. Patent Applications Nos. GB 2,116,199A and GB 2,140,450 exhibit improved rheological properties as evaluated by testing product viscosity as a function of shear rate. The compositions exhibited higher viscosity at a low shear rate and lower viscosity at a high shear rate, the data indicating efficient fluidization and gellation well within the shear rate extant within the standard dishwasher machine. In practical terms, this means improved pouring and processing characteristics as well a less leaking in the machine dispenser-cup, compared to prior liquid or gel ADD products. For applied shear rates corresponding to 3 to 30 rpm, viscosities (Brookfield) correspondingly ranged from about 10,000 to 30,000 cps to about 2,000 to 6,000 cps, as measured at room temperature by means of an LVT Brookfield viscometer after 3 minutes using a No. 4 spindle. A shear rate of 7.4 sec$^{-1}$ corresponds to a spindle rpm of about 3. An approximate ten-fold increase in shear rate produces about a 3- to 9-fold reduction in viscosity. With prior ADD gels, the corresponding reduction in viscosity was only about two-fold. Moreover, with such compositions, the initial viscosity taken at about 3 rpm was only about 2,500 to 2,700 cps. The compositions of the assignee's prior invention thus exhibit threshold fluidizations at lower shear rates and of significantly greater extent in terms of incremental increases in shear rate versus incremental decrease in viscosity. This property of the LADD products of the prior invention is summarized in terms of a thixotropic index (TI) which is the ratio of the apparent viscosity at 3 rpm and at 30 rpm. The prior compositions have a TI of from 2 to 10. The LADD compositions tested exhibited substantial and quick return to prior quiescent state consistency when the shear force was discontinued.

The present invention is based upon the discovery that the physical stability, i.e. resistance to phase separation, settling, etc., of the U.K. Patent Applications Nos. GB 2,116,199A and GB 2,140,450 and of the U.S. Patent Application Ser. No. 744,754 liquid aqueous ADD compositions can be significantly improved or not adversely affected while at the same time significantly improving the stability against rheological properties variations with time and temperature by adding to the composition a small but effective amount of polyacrylic acid polymers and copolymers and their salts and small effective amounts of a metal salt of a long chain fatty acid.

As an example of the improvement in rheological properties, it has been found that the viscosities at low shear rates, e.g. at a spindle rpm of about 3, apparent viscosities may often be increased from two- to threefold with the incorporation of as little as 1% or less of the polyacrylic acid polymer or copolymer and their salts and as little as 0.25% of the fatty acid metal salt stabilizer. At the same time, the physical stability may be improved to such an extent that even after twelve weeks or longer, over temperature ranges extending from near freezing to 40° C. and more, the compositions containing the polyacrylic acid polymer or copolymer and their salts and the metal salt stabilizers are stable against rheological properties variations with time and temperature and do not undergo any visible phase separation.

The acrylic acid polymers and copolymers and their salts that can be used are generally commercially available and are briefly described as follows.

The polyacrylic acid polymers and their salts that can be used comprise water soluble low molecular weight polymers having the formula

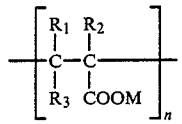

wherein the $R_1$, $R_2$ and $R_3$ can be the same or different and can be hydrogen, $C_1$–$C_4$ lower alkyl, or combinations thereof. The value of n is 5 to 2000, preferably, 10 to 1500, and more preferably 20 to 1000. M represents hydrogen, or an alkali metal such as sodium or potassium. The preferred substituent for M is sodium.

The preferred $R_1$, $R_2$ and $R_3$ groups are hydrogen, methyl, ethyl and propyl. Preferred acrylic acid monomer is one where $R_1$ to $R_3$ are hydrogen, e.g. acrylic acid, or where $R_1$ and $R_3$ are hydrogen and $R_2$ is methyl, e.g. methyl acrylic acid monomer.

The degree of polymerization, i.e. the value of n, is generally determined by the limit compatible with the solubility of the polymer or copolymer in water. The terminal or end groups of the polymer or copolymer are not critical and can be H, OH, $CH_3$ or a low molecular weight hydrocarbon.

Typically the polyacrylic acid copolymers can include copolymers of, for example, acrylic acid or methacrylic acid and a polycarboxylic acid anhydride or acid such as succinic anhydride, succinic acid, maleic acid, maleic anhydride, citric acid and the like.

The acrylic acid or methacrylic acid monomer will comprise 40–60 weight percent, e.g. about 50 weight percent of the copolymer with a polycarboxylic acid or anhydride.

The polyacrylic acid polymer or copolymer can have a molecular weight of 500 or 1,000 to 200,000, preferably 1,500 to 150,000 and especially preferably 2,000 to 100,000.

Specific polyacrylic acid polymers which can be used include the Acrysol LMW acrylic acid polymers from Rohm and Haas, such as the Acrysol LMW-45NX, a neutralized sodium salt, which has a molecular weight of about 4,500 and Acrysol LMW-20NX, a neutralized sodium salt, which has a molecular weight of about 2,000. The low molecular weight acrylic acid polymers can, for example, have a molecular weight of about 1,000 to 10,000. Another polyacrylic acid polymer that can be used is Alcosperse 110 (from Alco) which is a sodium salt of an organic polycarboxylate and which has a molecular weight of about 100,000.

A polyacrylic acid copolymer that can be used is Sokalan CP5 (from BASF) which has a molecular weight of about 70,000 and is the reaction product of about equal moles of methyacrylic acid and maleic anhydride which has been completely neutralized to form the sodium salt thereof.

The above polymers and copolymers can be made using procedures known in the art, see for example U.S. Pat. No. 4,203,858.

The amount of the polyacrylic acid polymer or copolymer stabilizer needed to achieve the desired enhancement of physical stability will depend on such factors as the nature of the fatty acid salt, the nature and amount of the thixotropic agent, detergent active compound, inorganic salts, especially TPP, other LADD ingredients, as well as the anticipated storage and shipping conditions.

Generally, however, amounts of the polyacrylic acid polymer or copolymer stabilizing agents that can be used are in the range of from about 0.5 to 1.5%, preferably from about 0.80 to 1.2%, especially preferably about 1.0%.

The preferred long chain fatty acids are the higher aliphatic fatty acids having from about 8 to about 22 carbon atoms, more preferably from about 10 to 20 carbon atoms, and especially preferably from about 12 to 18 carbon atoms, inclusive of the carbon atom of the carboxyl group of the fatty acid. The aliphatic radical may be saturated or unsaturated and may be straight or branched. Straight chain saturated fatty acids are preferred. Mixtures of fatty acids may be used, such as those derived from natural sources, such as tallow fatty acid, coco fatty acid, soya fatty acid, etc., or from synthetic sources available from industrial manufacturing processes.

Thus, examples of the fatty acids from which the polyvalent metal salt stabilizers can be formed include, for example, decanoic acid, dodecanoic acid, palmitic acid, myristic acid, stearic acid, oleic acid, eicosanoic acid, tallow fatty acid, coco fatty acid, soya fatty acid, mixtures of these acids, etc. Stearic acid and mixed fatty acids are preferred.

The preferred metals are the polyvalent metals of Groups IIA, IIB and IIIB, such as magnesium, calcium, aluminum and zinc, although other polyvalent metals, including those of Groups IIIA, IVA, VA, VIA, VIIA, IB, IVB, VB, VIB, VIIB, and VIII of the Periodic Table of the Elements can also be used. Specific examples of such other polyvalent metals include Ti, Zr, V, Nb, Mn, Fe, Co, Ni, Cd, Sn, Sb, Bi, etc. Generally, the metals may be present in the divalent to pentavalent state. Preferably, the metal salts are used in their higher oxidation states. Naturally for LADD compositions, as well a any other applications where the invention composition will or may come into contact with articles used for the handling, storage or serving of food products or which otherwise may come into contact with or be consumed by people or animals, the metal salt should be selected by taking into consideration the toxicity of the metal. For this purpose, the calcium and magnesium salts are especially highly preferred as generally safe food additives.

Many of these metal salts are commercially available. For example, the aluminum salts are available in the triacid form, e.g. aluminum stearate as aluminum tristearate, $Al(C_{17}-H_{35}COO)_3$. The monoacid salts, e.g. aluminum monostearate, $Al(OH)_2(C_{17}H_{35}COO)$ and diacid salts, e.g. aluminum distearate, $Al(OH)C_{17}H_{35}COO)_2$, and mixtures of two or three of the mono-, di- and triacid, salts can be used for those metals, e.g. Al, with valences of +3, and mixtures of the mono- and diacid salts can be used for those metals, e.g. Zn, with valences of +2. It is most preferred that the diacids of the +2 valent metals and the triacids of the +3 valent metals, the tetraacids of the +4 metals, and the pentaacids of the +5 valent metals, be used in predominant amounts. For example, at least 30%, preferably at least 50%, especially preferably from 80 to 100% of the total metal salt should be in the highest possible oxidation state, i.e. each of the possible valence sites is occupied by a fatty acid residue.

The metal salts, as mentioned above, are generally commercially available but can be easily produced by, for example, saponification of a fatty acid, e.g. animal fat, stearic acid, etc., or the corresponding fatty acid ester, followed by treatment with an hydroxide or oxide of the polyvalent metal, for example, in the case of the aluminum salt, with alum, alumina, etc.

Calcium stearate, i.e. calcium distearate, magnesium stearate, i.e. magnesium distearate, aluminum stearate, i.e. aluminum tristearate, and zinc stearate, i.e. zinc distearate, are the preferred polyvalent fatty acid salt stabilizers. Mixed fatty acid metal salts, such as the naturally occurring acids, e.g. coco acid, as well as mixed fatty acids resulting from the commercial manufacturing process are also advantageously used as an inexpensive but effective source of the long chain fatty acid.

The amount of the fatty acid salt stabilizers to achieve the desired enhancement of physical stability will also depend on such factors as the nature of the fatty acid salt, the nature and amount of the thixotropic agent, detergent active compound, inorganic salts, especially TPP, other LADD ingredients, as well as the anticipated storage and shipping conditions.

Generally, however, amounts of the polyvalent metal fatty acid salt stabilizing agents in the range of from about 0.10 to 0.5%, preferably from about 0.2 to 0.4%, especially preferably from about 0.25 to 0.30%. The use of the polyacrylic acid polymer or copolymer together with the polyvalent metal fatty acid salt stabilizing agents provide the long term physical stability, stability against rheological properties variations with time and temperature and absence of phase separation upon standing or during transport at both low and elevated temperatures as are required for a commercially acceptable product.

From the examples to be given below, it will be seen that, depending on the amounts, proportions and types of physical stabilizers and thixotropic agents, the addition of the polyacrylic acid polymers or copolymers and of the fatty acid salt not only increases physical stability but also in some cases provides a simultaneous increase in apparent viscosity and provides stability against rheological properties variations with time and/or temperature.

The physical stabilizing agents are added just before adding the clay thickener. Excluding the chlorine bleach compound, total salt concentration (NaTPP, sodium silicate and carbonate) is generally about 20 to 50 weight percent, preferably about 30 to 40 weight percent in the composition.

Another highly preferred method for mixing the ingredients of the LADD formulations involves first forming a mixture of the water, foam suppressor, detergent, physical stabilizers (polyacrylic acid polymer or copolymer and fatty acid salt) and thixotropic agent, e.g. clay. These ingredients are mixed together under high shear conditions, preferably starting at room temperature, to form a uniform dispersion. This this premixed portion, the remaining ingredients are introduced under low shear mixing conditions. For instance, the required amount of the premix is introduced into a low shear mixer and thereafter the remaining ingredients are added, with mixing, either sequentially or simultaneously. Preferably, the ingredients are added sequentially, although it is not necessary to complete the addition of all of one ingredient before beginning to add the next ingredient. Furthermore, one or more of the ingredients can be divided into portions and added at different times. Good results have been obtained by adding the remaining ingredients in the following sequence: sodium hydroxide, alkali metal carbonate, sodium silicate, alkali metal tripolyphosphate (hydrated), alkali metal tripolyphosphate (anhydrous or up to 5% water), bleach (preferably, sodium hypochlorite) and sodium hydroxide.

Other conventional ingredients may be included in these compositions in small amounts, generally less than about 3 weight percent, such as perfume, hydrotropic agents such as the sodium benzene, toluene, xylene and cumene sulphonates, preservatives, dyestuffs and pigments and the like, all of course being stable to chlorine bleach compound and high alkalinity (properties of all the components). Especially preferred for colouring are the chlorinated phthalocyanines and polysulphides of aluminosilicate which provide, respectively, pleasing green and blue tints. $TiO_2$ may be employed for whitening or neutralizing off-shades.

The liquid ADD compositions of this invention are readily employed in known manner for washing dishes, other kitchen utensils and the like in an automatic dishwater, provided with a suitable detergent dispenser, in an aqueous wash bath containing an effective amount of the composition.

While the invention has been particularly described in connection with its application to liquid automatic dishwasher detergents it will be readily understood by one of ordinary skill in the art that the benefits which are obtained by the addition of the long chain fatty acid metal salt, namely increased physical stability of the clay based thixotropic suspension and stability against rheological properties variations with time, will apply equally well to other clay based thixotropic suspensions, such as the scouring paste formulations described in the aforementioned U.S. Pat. No. 3,985,668.

The invention may be put into practice in various ways and a number of specific embodiments will be described in illustrate the invention with reference to the accompanying examples.

All amounts and proportions referred to herein are by weight of the composition unless otherwise indicated.

EXAMPLE 1

In order to demonstrate the effect of the polyacrylic acid polymer or copolymer and the metal salt stabilizers liquid ADD formulations are prepared with varying amounts of the polyacrylic acid polymer or copolymer and the fatty acid salt stabilizers and thixotropic clay thickener as follows:

THIXOTROPIC CLAY FORMULATIONS

|  | Percent |
|---|---|
| Deionized water | 41.10 to 42.55 |
| Caustic soda solution (50% NaOH) | 2.20 |
| Sodium carbonate, anhydrous | 5.00 |
| Sodium silicate, 47.5% solution of $Na_2O:SiO_2$ ratio of 1:2.4 | 15.74 |
| Sodium TPP (substantially anhydrous-i.e. 0-5%, especially 3%, moisture) (Thermphos NW) | 12.00 |
| Sodium TPP Hexahydrate (Thermphos N hexa) | 12.00 |

The mixture is cooled at 25°-30° C. and agitation maintained throughout, and the following ingredients at room temperature are added thereto:

|  | Percent |
|---|---|
| Sodium hypochlorite solution (11% available chlorine) | 9.00 |
| Monostearyl phosphate | 0.16 |
| DOWFAX 3B-2 (45% Na monodecyl/didecyl diphenyl oxide disulphonate-aqueous solution) | 0.80 |
| Polyacrylic acid polymer or copolymer | 0-1.0 |
| Aluminum tristearate | 0-0.4 |
| Pharmagel H | 0.25-2.0 |

The monostearyl phosphate foam depressant and Dowfax 3B-2 detergent active compound, the polyacrylic acid polymer or copolymer and the aluminum tristearate or zinc distearate stabilizer are added to the mixture just before the Pharmagel H clay thickener.

Each of the resulting liquid ADD formulations as shown in Table I below are measured for density, apparent viscosity at 3 and 30 rpm, and physical stability (phase separation) on standing and in a shipping test. The results are also shown in Table I.

From the data reported in Table I the following conclusions are reached:

The incorporation of 0.10% aluminum tristearate in a 1.25% Pharmagel H containing formula, Run 2 (control) leads to an increase of the physical stability and of the apparent viscosity as compared to Run 1 (control).

The incorporation of 0.4% aluminum tristearate or 0.3% aluminum tristearate in a 0.25% Pharmagel H containing formula, Runs 3 (control) and 4 (control), as compared to the Run 1 (control) leads to an increase of the physical stability without any drastic viscosity increase. The use of the higher aluminum tristearate levels of 0.4% and 0.3%, Runs 3 (control) and 4 (control), also allows the reduction of the clay level content downward from 1.25%, Run 2 (control) to 0.25%, Runs 3 (control) and 4 (control), while maintaining the physical stability of the formulation.

The Table 1 data also show that the addition of about 1.0% of Acrysol LMW-45NX, Runs 5 and 6, 1.0% of Alcospherse 110, Runs 7 and 8 and 1.0% of Sokalan CP5, Runs 9 and 10 do not adversely affect the physical stability of the formulations while allowing the reduction of the clay content to 0.3 to 0.5%.

TABLE I

| RUN | FORMULATION | DENSITY (g/cm³) | BROOK LVI VISCOSITY (KCPS) (1) | | UNSHAKEN LIQUID SEPARATION (%) (AFTER 12 WEEKS) | | | | RT IN PLASTIC (3) | SHIPPING TEST (%) (4) |
|---|---|---|---|---|---|---|---|---|---|---|
| | | | 3 RPM | 30 RPM | 4° C. IN GLASS (2) | RT In GLASS (2) | 35° C. IN GLASS (2) | 43° C. IN GLASS (2) | | |
| 1 (control) | $H_2O$ = 41.10% Polyacrylic acid = 0% Aluminum stearate = 0% Pharmagel H = 2.0% | 1.25 | 13 | 4 | 1-3 | 1-2 | 0 | 0 | 1-5 | 1-5 |
| 2 (control) | $H_2O$ = 41.75% Polyacrylic acid = 0% Alum. tristearate = 0.10% Pharmagel H = 1.25% | 1.32 | 28 | 6.8 | 0 | 0 | 0 | 0 | 1 | 0 |
| 3 (control) | $H_2O$ = 42.45% Polyacrylic acid = 0% Alum. tristearate = 0.4% Pharmagel H = 0.25% | 1.35 | 10 | 2.9 | 0 | 0 | 0 | 0 | 0 | 0 |
| 4 (control) | $H_2O$ = 42.55% Polyacrylic acid = 0% Alum. tristearate = 0.3% Pharmagel H = 0.25% | 1.33 | 9 | 2.7 | 0 | 0 | 0 | 0 | 1 | 3 |
| 5 | $H_2O$ = 41.55% Acrysol LMW-45NX = 1.0% Alum. tristearate = 0.25% Pharmagel H = 0.3% | 1.31 | 7 | 2.1 | 3 | 0 | 0 | 0 | 0 | 0 |
| 6 | $H_2O$ = 41.20% Acrysol LMW-45NX = 1.0% Alum. tristearate = 0.4% Pharmagel H = 0.5% | 1.30 | 16 | 3.6 | 0 | 0 | 0 | 0 | 0 | 0 |
| 7 | $H_2O$ = 41.55% Alcosperse 110 = 1.0% Alum. trostearate = 0.25% | 1.31 | 14 | 2.5 | 3 | 0 | 0 | 0 | 0.5 | 0 |

TABLE I-continued

| RUN | FORMULATION | DENSITY (g/cm³) | BROOK LVI VISCOSITY (KCPS) (1) 3 RPM | BROOK LVI VISCOSITY (KCPS) (1) 30 RPM | UNSHAKEN LIQUID SEPARATION (%) (AFTER 12 WEEKS) 4° C. IN GLASS (2) | UNSHAKEN LIQUID SEPARATION (%) (AFTER 12 WEEKS) RT In GLASS (2) | UNSHAKEN LIQUID SEPARATION (%) (AFTER 12 WEEKS) 35° C. IN GLASS (2) | UNSHAKEN LIQUID SEPARATION (%) (AFTER 12 WEEKS) 43° C. IN GLASS (2) | RT IN PLASTIC (3) | SHIPPING TEST (%) (4) |
|---|---|---|---|---|---|---|---|---|---|---|
| 8 | Pharmagel H = 0.3% H₂O = 41.20% Alcosperse 110 = 1.0% Alum. tristearate = 0.4% | 1.30 | 9 | 3.2 | 0 | 0 | 0 | 0 | 0 | 0 |
| 9 | Pharmagel H = 0.5% H₂O = 41.20% Sokalan CP5 = 1.0% Alum. tristearate = 0.4% | 1.33 | 30 | 5.6 | 0 | 0 | 0 | 0 | 1.4 | 0 |
| 10 | Pharmagel H = 0.5% H₂O = 41.55% Sokalan CP5 = 1.0% Alum. tristearate = 0.25% Pharmagel = 0.3% | 1.33 | 9 | 2.4 | 0 | 0 | 0 | 0 | 1.5 | 0 |

Notes to Table I
(1) Measured with spindle 4 after 3 minutes on 24 hour old samples.
(2) In Height (RT = room temperature = 20 ± 2° C.).
(3) In Weight (RT = room temperature = 20 ± 2° C.).
(4) Liquid separation measured after 6 weeks and 2000 Kms in a private car (in weight in a plastic bottle), except Run 1 (control) that was measured at 3000 Kms.

EXAMPLE 2

In order to determine the rheological properties variations with time the apparent viscosities of the Runs 2 to 10 of Example 1 were measured at 3 RPM and 30 RPM after 1 day, 2 weeks, 4 weeks, 6 weeks and 12 weeks and the data obtained is reported in the Table II below.

The Table II data show that the addition of 1.0% Acrysol LMW-45NX (Run 5), 1.0% Alcosperse 110 (Run 7) or 1.0% Sokalan CP5 (Run 10) leads to a strong stabilization of the rheological properties variations with time without altering the physical stabilities of the formulations at a Pharmagel H clay content of 0.3%, as compared to the Runs 3 and 4 (control) which show drastic apparent viscosity variations with time.

EXAMPLE 3

In order to determine the rheological properties variations with time and temperature the apparent viscosities at 3RPM were measured at 4° C., RT, 35° C. and 43° C. at each of 2, 4, 6 and 12 weeks and the data obtained is reported in Table III below.

The Table III data show that the addition of 1.0% Acrysol LMW-45 (Run 5), 1.0% Alcosperse 110 (Run 7) or 1.0% Sokalan CP5 (Run 10) leads to a strong stabilization of the rheological properties variations with time at all temperatures in formulations containing 0.25% aluminum tristearate and 0.3% Pharmagel H as compared to the formulation containing 0.1% aluminum tristearate and 1.25% Pharmagel H clay, Run 2 (control).

TABLE II

| | SIMULTANEOUS USE OF POLYACRYLIC ACID AND ALUMINUM TRISTEARATE | | | | |
|---|---|---|---|---|---|
| | BROOKFIELD LVT VISCOSITY AT 3 AND 30 RPM AFTER X DAYS AT RT (KCPS) (1) | | | | |
| RUN | X = 1 DAY | X = 2 WEEKS | X = 4 WEEKS | X = 6 WEEKS | X = 12 WEEKS |
| 2 (control) | 28/6.8 | 24/3.4 | 34/6.9 | 53/7 | 41/6.7 |
| 3 (control) | 10/2.9 | 51/6.4 | (2) | 48/7.6 | 200/20 |
| 4 (control) | 9/2.7 | 38/6.2 | 86/5 | 78/11 | 64/8.2 |
| 5 | 7/2.1 | 14/3.4 | 17/3.4 | 38/4.6 | 29/5.6 |
| 6 | 16/3.6 | 40/5.9 | 56/6.4 | 78/9.2 | 80/10.8 |
| 7 | 14/2.5 | 13/2.6 | 17/2.9 | 64/8 | 34/6.8 |
| 8 | 9/3.2 | 38/6.6 | 56/8.6 | 73/9.6 | 149/13 |
| 9 | 30/5.6 | 82/12 | 100/11 | 113/15.4 | 180/16.2 |
| 10 | 9/2.4 | 18/3.8 | 52/7.5 | 34/4.2 | 58/5.3 |

(1) Measured with spindle 4 after 3 minutes in a glass bottle left on a shelf.
(2) No measurement

TABLE III

SIMULTANEOUS USE OF POLYACRYLIC ACIDS AND ALUMINUM TRISTEARATE RHEOLOGICAL PROPERTIES VARIATION WITH TIME AT ALL TEMPERATURES

UNSHAKEN BROOKFIELD LVT VISCOSITY AT 3 RPM AFTER X WEEKS (KCPS) (1)

| RUN | AT 4° C. | | | | AT RT | | | | AT 35° C. | | | | AT 43° C. | | | |
|---|---|---|---|---|---|---|---|---|---|---|---|---|---|---|---|---|
| | X = 2 | X = 4 | X = 6 | X = 12 | X = 2 | X = 4 | X = 6 | X = 12 | X = 2 | X = 4 | X = 6 | X = 12 | X = 2 | X = 4 | X = 6 | X = 12 |
| 2 (control) | 19 | 23 | 25 | 29 | 24 | 34 | 53 | 41 | 36 | 48 | 52 | 58 | (2) | 74 | 120 | 180 |
| 5 | (2) | (2) | (2) | (2) | 14 | 17 | 38 | 29 | 24 | 32 | 36 | 56 | 46 | 45 | 95 | (2) |
| 7 | 7 | (2) | (2) | (2) | 13 | 17 | 64 | 34 | 31 | 30 | 26 | 52 | 48 | 68 | 94 | 99 |
| 10 | 7 | 9 | 34 | 19 | 18 | 52 | 34 | 58 | 76 | 80 | 40 | 62 | 50 | 46 | 54 | 57 |

(1) Measured with spindle 4 after 3 minutes in a glass bottle left on a shelf.
(2) No measurement.

EXAMPLE 4

The following gel-like thixotropic liquid ADD is prepared following the same general procedures as in Example 1:

| Ingredient | Amount (A.I.) Wt % |
| --- | --- |
| Sodium silicate (47.5% solution of $Na_2O:SiO_2$ ratio of 1:2.4) | 7.48 |
| Monostearyl phosphate | 0.16 |
| Dowfax 3B-2 | 0.36 |
| Thermphos NW | 12.0 |
| Thermphos N hexa | 12.0 |
| Acrysol LMW-45NX | 1.0 |
| Aluminum tristearate | 0.25 |
| Sodium carbonate, anhydrous | 4.9 |
| Caustic soda solution (50% NaOH) | 3.1 |
| Pharmagel H | 1.25 |
| Sodium hypochlorite solution (11%) | 1.0 |
| Water | balance |
| pH = 13 to 13.4 | |

Minor amounts of perfume, color, etc. can also be added to formulation.

We claim:

1. An aqueous thixotropic automatic dishwasher composition comprising approximately by weight:
    (a) 5 to 35% alkali metal tripolyphosphate;
    (b) 2.5 to 20% sodium silicate;
    (c) 0 to 9% alkali metal carbonate;
    (d) 0.1 to 5% chlorine bleach stable, water-dispersible organic detergent active material;
    (e) 0 to 5% chlorine bleach stable foam depressant;
    (f) chlorine bleach compound in an amount to provide about 0.1 to 4% of available chlorine;
    (g) thixotropic thickener in an amount sufficient to provide the composition with a thixotropy index of about 2 to 10;
    (h) 0 to 8% of sodium hydroxide;
    (i) a physical and rheological properties stabilizing agent comprising about 0.5 to 1.5 percent of a water soluble polyacrylic acid polymer or copolymer with a polycarboxylic acid or polycarboxylic acid anhydride, or salts thereof, said polyacrylic acid polymer or copolymer containing acrylic acid units of the formula

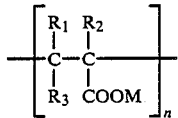

wherein $R_1$, $R_2$ and $R_3$ can be the same or different and can be hydrogen, $C_1$–$C_4$ lower alkyl, M represents hydrogen, or an alkali metal, n=5 to 2,000 and the polymer or copolymer has a molecular weight of 1,000 to 200,000, and about 0.1 to 0.5 percent of a polyvalent metal salt of a long chain fatty acid; and
    (j) balance water.

2. The composition of claim 1 wherein said composition comprises a polycrylic acid polymer, or the salts thereof and has a molecular weight of 1,500 to 150,000.

3. The composition of claim 1 wherein said composition comprises a copolymer of an acrylic acid and a polycarboxylic acid or polycarboxylic acid anhydride, or the salts thereof and has a molecular weight of 1,500 to 150,000.

4. The composition of claim 1 wherein the metal salt comprises a polyvalent metal salt of a metal of Group II, III or IV of the Period Table of the Elements of a long chain fatty acid having from about 8 to 22 carbon atoms or mixture of two or more of such fatty acid.

5. The composition of claim 1 wherein the polyvalent metal is aluminum, zinc, calcium or magnesium.

6. The composition of claim 1 wherein the fatty acid metal salt is aluminum tristearate, calcium stearate or magnesium stearate.

7. The composition of claim 1 wherein the polymer stabilizer comprises polyacrylic acid polymer neutralized alkali metal salt and has a molecular weight of 1,500 to 150,000.

8. The composition of claim 1 wherein the polymer stabilizer comprises polymethyacrylic acid polymer and has a molecular weight of 2,000 to 100,000.

9. The composition of claim 1 wherein the copolymer stabilizer comprises acrylic acid monomer and a polycarboxylic acid or anhydride monomer selected from the group consisting of succinic acid, succinic acid anhydride, maleic acid, maleic acid anhydride and citric acid and has a molecular weight of 2,000 to 100,000.

10. The composition of claim 9 wherein the acrylic acid monomer comprise 40 to 60 weight percent of the copolymer.

11. The composition of claim 1 wherein the metal salt stabilizer is a polyvalent metal salt of an aliphatic fatty acid having from about 8 to 22 carbon atoms.

12. The compositions of claim 1 wherein the acid has from about 12 to 18 carbon atoms.

13. The composition of claim 1 wherein the metal salt stabilizer is the aluminum salt or zinc salt of said fatty acid.

14. The composition of claim 1 wherein the metal salt stabilizer is aluminum tristearate.

15. The composition of claim 1 wherein the metal salt stabilizer is zinc distearate.

16. The composition of claim 1 which contains 0.1 to 0.5 weight percent clay.

17. The composition of claim 1 wherein the thixotropic thickener (g) is an inorganic, colloid-forming clay.

18. An aqueous thixotropic automatic dishwasher composition comprising approximately by weight:
    (a) 5 to 35% alkali metal tripolyphosphate;
    (b) 2.5 to 20% sodium silicate;
    (c) 0 to 9% alkali metal carbonate;
    (d) 0.1 to 5% chlorine bleach stable, water-dispersible organic detergent active material;
    (e) 0 to 5% chlorine bleach stable, water-dispersible organic detergent active material;
    (e) 0 to 5% chlorine bleach stable foam depressant;
    (f) chlorine bleach compound in an amount to provide about 0.2 to 4% of available chlorine;
    (g) thixotropic thickener in an amount of 0.1 to 0.5 percent sufficient to provide the composition with a thixotropy index of about 2 to 10;
    (h) 0 to 8% of sodium hydroxide;
    (i) a physical and rheological properties stabilizing agent comprising about 0.5 to 1.5 percent of a water soluble polyacrylic acid polymer or salts thereof, said polyacrylic acid polymer containing acrylic acid units of the formula

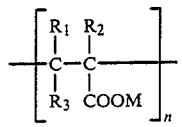

wherein $R_1$ and $R_3$ are hydrogen, and $R_2$ is hydrogen or methyl, M represents hydrogen, sodium or potassium, n = 5 to 30 and the polymer has a molecular weight of 2,000 to 100,000, and about 0.1 to 0.5 percent of a polyvalent metal salt of an aliphatic fatty acid having from 12 to 18 carbon atoms; and (j) balance water.

19. The composition of claim 18 wherein the polymer is polyacrylic acid polymer or salt having a molecular weight of about 2,000.

20. The composition of claim 18 wherein the polymer is polyacrylic acid polymer or salt having a molecular weight of about 4,500.

21. The composition of claim 18 wherein the polymer is polyacrylic acid polymer or salt having a molecular weight of about 100,000.

22. The composition of claim 18 wherein the metal salt stabilizer is aluminum tristearate.

23. The composition of claim 18 wherein the metal salt stabilizer is zinc distearate.

24. The composition of claim 18 which contains 0.2 to 0.4 weight percent clay, 0.8 to 1.2 weight percent polyacrylic acid polymer or salt and 0.2 to 0.4 weight percent fatty acid metal salt.

25. The composition of claim 18 wherein the thixotropic thickener (g) is an inorganic, colloid-forming clay.

26. An aqueous thixtropic automatic dishwasher composition comprising approximately by weight:

(a) 5 to 35% alkali metal tripolyphosphate;
(b) 2.5 to 20% sodium silicate;
(c) 0 to 9% alkali metal carbonate;
(d) 0.1 to 5% chlorine bleach stable, water-dispersible organic detergent active material;
(e) 0 to 5% chlorine bleach stable foam depressant;
(f) chlorine bleach compound in an amount to provide about 0.2 to 4% of available chlorine;
(g) thixotropic thickener in an amount of 0.1 to 0.5 percent sufficient to provide the composition with a thixotropy index of about 2 to 10;
(h) 0 to 8% of sodium hydroxide;
(i) a physical and rheological properties stabilizing agent comprising about 0.5 to 1.5 percent of a water soluble copolymer of acrylic acid and a polycarboxylic acid or polycarboxylic acid anhydride, or salts thereof, said copolymer containing acrylic acid units of the formula

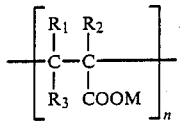

wherein $R_1$ and $R_3$ are hydrogen and $R_2$ is hydrogen or methyl, M represents hydrogen, sodium or potassium, n = 10 to 1,500 and the copolymer has a molecular weight of 2,000 to 100,000, and about 0.1 to 0.5 percent of a polyvalent metal salt of an aliphatic fatty acid having from 12 to 18 carbon atoms; and (j) balance water.

27. The composition of claim 26 wherein the copolymer comprises acrylic acid monomer an da polycarboxylic acid or anhydride monomer selected from the group consisting of succinic acid, succinic acid anhydride, maleic acid, maleic acid anhydride and citric acid and has a molecular weight of about 70,000.

28. The composition of claim 26 wherein the acrylic acid monomer comprises 40 to 60 weight percent of the copolymer.

29. The composition of claim 26 wherein the copolymer consists of the reaction product of about equal moles of methacrylic acid and maleic anhydride which has been completely neutralized to form the sodium salt thereof.

30. The composition of claim 26 wherein the metal salt stabilizer is the aluminum salt or zinc salt of said fatty acid.

31. The composition of claim 26 wherein the metal salt stabilizer is aluminum tristearate.

32. The composition of claim 26 wherein the metal salt stabilizer is zinc distearate.

33. The composition of claim 26 which contains 0.2 to 0.5 weight percent clay, 0.8 to 1.2 weight percent polyacrylic acid copolymer, and 0.2 to 0.4 weight percent fatty acid metal salt.

34. The composition of claim 26, wherein the thixotropic thickener (g) is an inorganic, colloid-forming clay.

35. A method for cleaning soiled dishware in an automatic dishwashing machine which comprises contacting the soiled dishware in an automatic dishwashing machine in an aqueous washbath having dispersed therein an effective amount of the composition of claim 18.

36. A method for cleaning soiled dishware in an automatic dishwashing machine which comprises contacting the soiled dishware in an automatic dishwashing machine in an aqueous washbath having dispersed therein an effective amount of the composition of claim 26.

* * * * *